(12) United States Patent
Kirkham

(10) Patent No.: US 6,424,460 B1
(45) Date of Patent: Jul. 23, 2002

(54) DUAL FIELD-OF-VIEW OBJECTS SYSTEM FOR THE INFRARED

(75) Inventor: Anthony John Kirkham, St Asaph (GB)

(73) Assignee: Pilkington PE Limited, St. Asaph (GB)

( * ) Notice: Subject to any disclaimer, the term of this patent is extended or adjusted under 35 U.S.C. 154(b) by 0 days.

(21) Appl. No.: 09/674,111

(22) PCT Filed: Apr. 28, 1999

(86) PCT No.: PCT/GB99/01326

§ 371 (c)(1),
(2), (4) Date: Nov. 30, 2000

(87) PCT Pub. No.: WO99/59015

PCT Pub. Date: Nov. 18, 1999

(30) Foreign Application Priority Data

May 8, 1998 (GB) ............................................... 9809738

(51) Int. Cl.⁷ ............................................... G02B 15/14
(52) U.S. Cl. ..................... 359/353; 359/354; 359/355; 359/744; 359/823
(58) Field of Search .............................. 359/353, 354, 355, 356, 357, 721, 798, 799, 823, 824, 676, 744

(56) References Cited

U.S. PATENT DOCUMENTS

| | | | | |
|---|---|---|---|---|
| 4,411,488 A | * | 10/1983 | Neil | 359/354 |
| 4,479,695 A | | 10/1984 | Neil | |
| 4,600,265 A | * | 7/1986 | Norrie | 359/351 |
| 4,659,171 A | * | 4/1987 | Neil | 359/354 |
| 4,676,581 A | * | 6/1987 | Roberts | 359/354 |
| 4,679,891 A | | 7/1987 | Roberts | |
| 5,251,063 A | | 10/1993 | Baumann | |
| 6,018,414 A | * | 1/2000 | Chipper | 359/354 |
| 6,091,551 A | * | 7/2000 | Watanabe | 359/354 |
| 6,191,894 B1 | * | 2/2001 | Kitamura et al. | 359/676 |

FOREIGN PATENT DOCUMENTS

| | | |
|---|---|---|
| EP | 0 240 194 A1 | 10/1987 |
| EP | 0 367 197 A2 | 5/1990 |
| EP | 0 441 206 A1 | 8/1991 |

* cited by examiner

Primary Examiner—Cassandra Spyrou
Assistant Examiner—Christopher S Maxie
(74) Attorney, Agent, or Firm—Alston & Bird LLP

(57) ABSTRACT

A dual field-of-view objective system (40) which is inexpensive, has high transmission and is essentially achromatized and athermalized. The system (40) uses a silicon front lens A and all lens elements have positive temperature/refractive index change coefficient.

6 Claims, 1 Drawing Sheet

DUAL FIELD-OF-VIEW OBJECTS SYSTEM FOR THE INFRARED

This invention relates to optical systems and in particular to an athermalised dual field-of-view objective optical system capable of operating in the 3–5 micron thermal infra-red waveband and which is light in weight.

The major problem in most thermal infra red waveband lens design is athermalisation. In particular much of the thermal focus shift arises due to thermal refractive index change at the first lens. Accordingly prior proposals have either utilised a first lens which has been multiple element (which significantly increases weight because the first lens is diametrically the largest in the system) or single element made of zinc sulphide (which has a thermal change of refractive index coefficient which is close to zero). Zinc sulphide, however, is very expensive, heavy, and has comparatively poor transmission.

It is an object of the present invention to provide a relatively inexpensive athermalised light weight optical system capable of operating in the 3–5 micron waveband and which has a fixed front lens in the form of a single element made of silicon. Silicon does not have a thermal change of refractive index coefficient which is close to zero but is relatively inexpensive, light in weight and has good transmission. Additionally silicon is a non toxic material so that it does not present a health hazard during lens manufacture.

According to the present invention there is provided a dual field-of-view objective optical system capable of operating in the 3–5 micron thermal infra-red waveband, comprising a fixed front lens and a fixed rear lens aligned on a common optical axis and an intermediate lens located between the front and rear lenses and movable axially along the optical axis between two alternative in-use positions which provide two alternative focal lengths for the system, said front lens being a positively-powered single element made from silicon which is relatively non-dispersive in the 3–5 micron waveband and relatively insensitive to thermal change of refractive index, said intermediate lens being negatively powered and comprising a first lens element of greater negative power than is required solely for the field of view change and being made of a material which is relatively dispersive in the 3–5 micron waveband and relatively sensitive to thermal change of refractive index, and a second lens element of positive power and made of a material which is relatively non-dispersive in the 3–5 micron waveband and relatively insensitive to thermal change of refractive index, said rear lens being positively powered and comprising a first lens element which is positively powered and made of a material which is relatively non-dispersive in the 3–5 micron waveband and relatively insensitive to thermal change of refractive index, and a second lens element which is negatively powered and made of a material which is relatively dispersive in the 3–5 micron waveband and relatively sensitive to thermal change of refractive index, wherein each lens element in the system is made of a material having a positive temperature/refractive index change coefficient and the relative power of the lens elements of the intermediate and rear lenses are arranged simultaneously to provide correction for chromatic aberration and thermal defocus in both focal settings of the system.

Preferably said single element fixed front lens incorporates an aspheric refractive surface to provide correction for monochromatic aberration. Since the front lens is a single element it is not itself corrected for chromatic aberration and therefore the system has an imperfect but extremely good degree of chromatic aberration correction. A further improvement in chromatic aberration correction can be achieved by imposing a hybrid diffractive surface onto the aspheric surface of the first lens. This however, increases manufacturing costs and reduces transmission.

Preferably said rear lens is formed by three lens elements and the third lens element is positively powered and made of a material which is relatively non-dispersive in the 3–5 micron waveband and relatively insensitive to thermal change of refractive index. This arrangement of the rear lens having two positively powered lens elements enables these lens elements to be made of different materials which assists with correction of monochromatic aberration (according to their relative powers) and correction of residual errors in thermal and chromatic aberration (according to their relative dispersive characteristics).

Preferably the negatively-powered lens elements of the intermediate and rear lenses are made of Germanium. The positively-powered lens elements of the intermediate and rear lenses may be made of Silicon and/or Zinc Sulphide and/or Zinc Selenide and/or Arsenic Trisulphide.

By virtue of the present invention a dual field-of-view objective system is provided which is relatively inexpensive to manufacture and which can be made with high transmission whilst being essentially achromatised and athermalised. One example avoids use of surface-relief hologram surfaces diamond cut onto the front lens, such hybrid surfaces being known to reduce transmission and being a manufacturing on-cost. This example however is not fully achromatised for off-axis field angles, suffering from a small residual amount of transverse chromatic aberration. Another example, which is fully achromatised on and off axis, incorporates a surface-relief hologram on the front lens.

Embodiments of the present invention will now be described by way of example with reference to the accompanying drawings in which.

Figure 1:
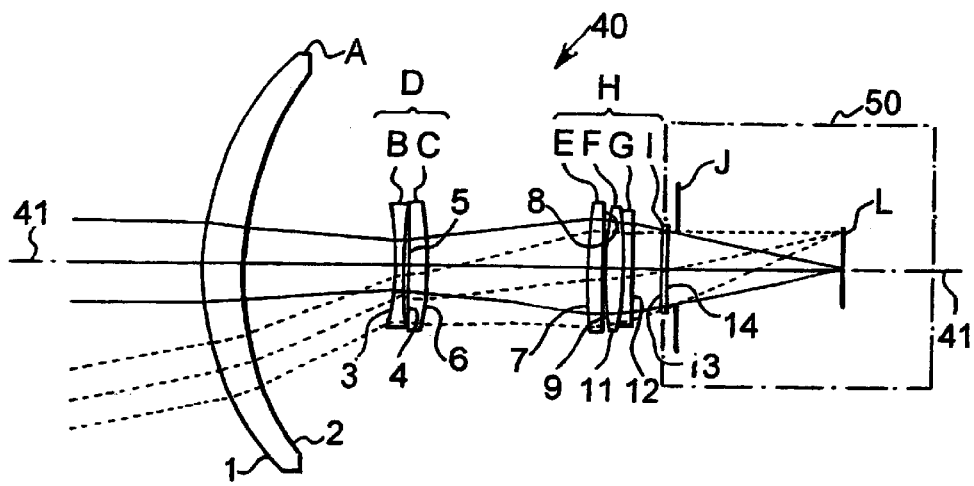
FIG. 1 illustrates a first dual field-of-view objective optical system in accordance with the present invention and with the components in a short focal length setting.
Figure 2:
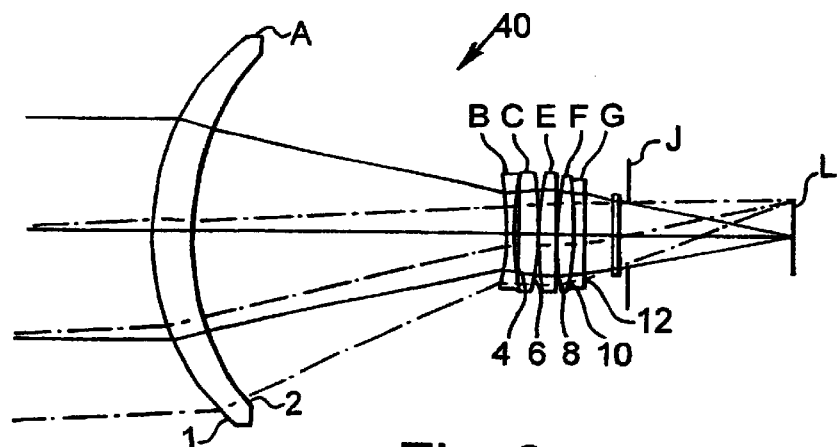
FIG. 2 illustrates the FIG. 1 system with the components in a long focal length setting.

As is shown in FIGS. 1 and 2 of the drawings a dual field-of-view objective optical system 40 capable of operating in the 3–5 micron thermal infra-red waveband comprises a fixed front lens A of positive power and a fixed rear lens H of positive power aligned on a common optical axis 41, and an intermediate lens D of negative power located between lenses A and H and movable axially between two alternative in-use positions which provide two alternative focal lengths for the system. FIG. 1 shows lens D abutting lens H and in this position a short focal length is achieved. FIG. 2 shows lens D approximately mid-way between lenses A and H and in this position a long focal length is achieved.

Lens A is a positively-powered single element (having refractive surfaces 1 and 2) made from silicon which is relatively non-dispersive in the 3–5 micron waveband and which is also relatively insensitive to thermal change of refractive index. Lens A is a single element which is not self corrected for chromatic aberration. It is however corrected for mono-chromatic aberrations by having at least one of its refractive surfaces 1, 2 aspheric.

Intermediate lens D is formed by two lens elements B, C and is negatively powered. Element B (having refractive surfaces 3 and 4) provides the negative power and is made of a material such as Germanium which is sensitive to thermal effects but is of greater negative power than is required solely for the field-of-view change such that a proportion of the necessary negative power is provided to the system 40 to cause the system to be essentially athermalised. Correction of the power of lens D is provided by a positively powered lens element C (having refractive surfaces 5 and 6) and because the Germanium element B also has high dispersion in the 3–5 micron waveband element C is selected from a low or relatively non-dispersive material such as silicon whereby elements B and C together correct for chromatic aberration of the system 40 (and of course element C is also relatively insensitive to thermal change of refractive index).

The rear lens H is formed by lens elements E, F and G of which elements E (having refractive surfaces 7 and 8) and F (having refractive surfaces 9 and 10) are both positively powered and may be replaced by a single positive element but the provision of two positively powered elements is advantageous as has already been explained. Elements E and F are preferably made of silicon and zinc selenide. The lens element G (having refractive surfaces 11 and 12) is negatively powered and is made of a material such as Germanium which is sensitive to thermal effects and which therefore enables further and final athermalisation correction of the system 40 to be achieved. Of course, such final athermalisation correction must take account of thermal expansion of the housing (not shown) in which the system 40 is mounted. Elements E, F and G together provide for correction of residual errors in chromatic aberration by virtue of the relative dispersive characteristics of the materials.

By way of example the characteristics for the 3–5 micron waveband of various preferred materials are set forth in Table I hereto. The thermal coefficient of Refractive Index (dN/dT) is a measure of change in refractive index with temperature and it will be seen that Germanium is very substantially more sensitive to temperature than the other materials listed. It is also substantially more dispersive. It will also be seen that Zinc Sulphide has a very low value for dN/dT being only about one quarter that of silicon. Arsenic Trisulphide has the lowest value for dN/dT but it is particularly susceptible to thermal shock and therefore is not a suitable material for the first lens.

The system 40 is intended to be used with a radiation detector system 50 illustrated in phantom and comprising a radiation receiving window I (having refractive surfaces 13 and 14), an internal cold-shield J which forms the aperture stop of the system 40 and a detector L which is cooled by a Dewar arrangement (not shown).

A specific numerical example of the system 40 is set forth in Table II hereto wherein all dimensions are in millimeters; positive radius of curvature indicates that the centre of curvature is on the right of the component whereas negative radius of curvature indicates that the centre of curvature is on the left of the component; SS indicates aspheric surface shape; and the separation is the distance on-axis from the preceding surface reading from left to right in FIGS., 1 and 2. The nominal focal length of the FIG. 1 arrangement is 53.0 mm whilst that of the FIG. 2 arrangement is 160.0 mm with the same common image plane.

The system set forth in Table II is designed for use with a housing in which the optical elements are mounted which is made of aluminium or other materials having a similar coefficient of thermal expansion ($23.6 \times 10^{-6}$ mm/° C.). The system 40 is substantially athermal in the wide field of view setting (FIG. 1) over a temperature range of ±20° C. about a design ambient temperature of 20° C. In the narrow field of view setting (FIG. 2) the system is substantially athermal over a temperature range of ±50° C. about the design ambient temperature. For certain applications the system 40 may be located behind a window which for example may be either planar or dome-shaped. If the window is powered minor modifications maybe required to the numerical data of Table II to achieve the same short and long focal length settings. Also, the athermalisation correction may require slight numerical adjustment to take account of the effects of temperature on the window.

Figure 3:
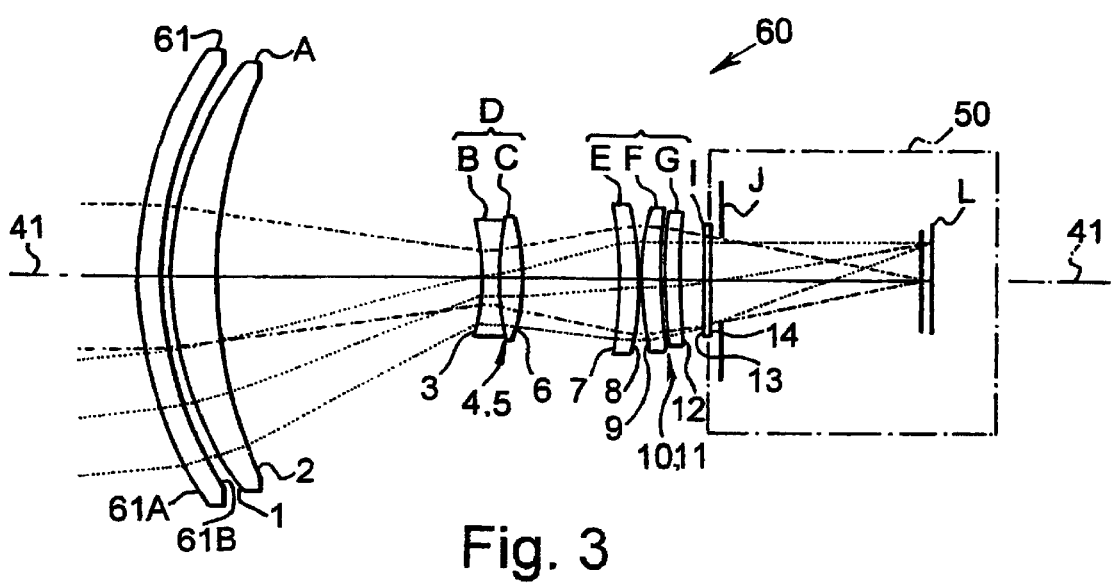
FIG. 3 illustrates an alternative system associated with a dome shaped window, in its short focal length setting.

FIG. 3 illustrates a system 60 which is also dual field of view operating in the 3–5 micron thermal infra red waveband and which is almost the same as system 40 (in its FIG. 1 setting) and accordingly like components are identified by like numerals. In FIG. 3 however system 60 is associated with a dome shaped window 61 having refractive surfaces 61A, 61B and additionally refractive surface 2 of lens A in addition to being aspheric carries a surface relief hologram in order to render system 60 fully achromatised. The narrow field-of-view setting of system 60 is not shown but is similar to the FIG. 2 setting of system 40 in that lens element C abuts lens element E (on axis).

A specific numerical example of the system 60 is set forth in Table III. The system 60 is substantially athermal in the wide field-of-view setting over a temperature range of ±50° C. about a design ambient temperature of 20° C. and is substantially athermal over a temperature range of ±50° C. in its narrow field-of-view setting. The surface-relief hologram on surface 2 of lens A is designed according to a phase function having a construction wavelength of 3.8 microns with the beam diffracted into Order 1. The phase function correlates the optical path difference (OPD) with the distance Y from the surface vertex according to the equation:

$$OPD = -0.19053 \times 10^{-4} Y^2 + 0.22492 \times 10^{-8} Y^4$$

TABLE I

| Material | Refractive index at 4.0 microns | Thermal coefficient of R.I. (dN/dT). | Dispersion (3 to 5 microns) | Toxic |
|---|---|---|---|---|
| Silicon | 3.424 | $162 \times 10^{-6}$ | .0108 | No |
| Germanium | 4.024 | $401 \times 10^{-6}$ | .0288 | No |
| Gallium Arsenide | 3.307 | $192 \times 10^{-6}$ | .0160 | Yes |
| Zinc Selenide | 2.433 | $62 \times 10^{-6}$ | .0081 | Yes |
| Zinc Sulphide | 2.252 | $42 \times 10^{-6}$ | .0111 | No |
| Arsenic TriSulphide | 2.411 | $1 \times 10^{-6}$ | .0089 | No |

TABLE II

| Item No | Material | Surface No | Radius | Separation | Diameter |
|---|---|---|---|---|---|
| A | SILICON | 1 | 75.9 | 0.000 | 105.4 |
|  |  | 2SS | 84.3 | 11.4 | 97.7 |
| B | GERMANIUM | 3 | −95.1 | 43.5 (FIG. 1) or 86.7 (FIG. 2) | 29.3 |
|  |  | 4SS | 221.3 | 2.8 | 29.5 |
| C | SILICON | 5 | −246.7 | 1.5 | 29.8 |
|  |  | 6 | −96.4 | 5.1 | 30.9 |

TABLE II-continued

| Item No | Material | Surface No | Radius | Separation | Diameter |
|---|---|---|---|---|---|
| E | SILICON | 7 | 158.1 | 43.5 (FIG. 1) or 0.4 (FIG. 2) | 31.0 |
| | | 8 | 7229.3 | 4.3 | 30.6 |
| F | ZnSe | 9 | 93.3 | 0.5 | 29.9 |
| | | 10 | −198.4 | 4.3 | 28.9 |
| G | GERMANIUM | 11 | −213.1 | 0.5 | 28.2 |
| | | 12SS | −1944.4 | 3.2 | 27.6 |
| I | GERMANIUM | 13 | PLANO | 8.2 | 21.3 |
| | | 14 | PLANO | 1.3 | 21.1 |
| J | | | PLANO | 2.5 | 19.2 |
| L | | | PLANO | 47.0 | |

The aspheric surfaces are defined by the equation $$Z = \frac{CY}{1 + \sqrt{(1 - (1+K)C^2 Y^2)}} + \alpha Y^4 + \beta Y^6 + \gamma Y^8$$

where Z=surface sag, C=radius$^{-1}$, Y is the distance from the surface vertex and K, $\alpha$, $\beta$, and $\gamma$ are the following coefficients:

| Surface No. | K | $\alpha$ | $\beta$ | $\gamma$ |
|---|---|---|---|---|
| 2 (SS) | 0.0 | $0.21089 \times 10^{-7}$ | $0.22592 \times 10^{-11}$ | $0.29950 \times 10^{-15}$ |
| 4 (SS) | 0.0 | $-0.39597 \times 10^{-6}$ | $0.19649 \times 10^{-10}$ | 0.00000 |
| 12 (SS) | 0.0 | $0.19673 \times 10^{-6}$ | $-0.12625 \times 10^{-10}$ | 0.00000 |

TABLE III

| Item | Material | Surface No | Radius | Separation | Diameter |
|---|---|---|---|---|---|
| 61 | Si | 61A | 94.0 | −4.82 | 98.0 |
| | | 61B | 89.2 | −2.000 | 94.0 |
| A | Si | 1 | 79.9 | 0.00 | 93.1 |
| | | 2SS (HYB) | 107.1 | 10.0 | 88.3 |
| B | Ge | 3 | −54.2 | 56.7 | 23.8 |
| | | 4SS | 52.8 | 3.5 | 24.2 |
| C | AS$_2$S$_3$ | 5 | 101.8 | 0.5 | 24.1 |
| | | 6 | −41.8 | 4.9 | 25.2 |
| E | Si | 7 | −124.4 | 20.1 | 30.3 |
| | | 8 | −66.9 | 4.7 | 31.2 |
| F | Si | 9 | 69.4 | 0.5 | 29.9 |
| | | 10 | 125.1 | 4.2 | 28.5 |
| G | Ge | 11 | 127.0 | 0.7 | 27.9 |
| | | 12 | 121.0 | 3.3 | 26.7 |
| I | Si | 13 | Plano | 5.5 | 22.5 |
| | | 14 | | 1.3 | 20.6 |
| J | — | — | Plano | 2.54 | 20.6 |
| L | — | — | Plano | 46.8 | 20.7 |

| Surface. No. | K | $\alpha$ | $\beta$ | $\gamma$ |
|---|---|---|---|---|
| 2 (SS) | 0 | $0.86068 \times 10^{-8}$ | $-0.78317 \times 10^{-13}$ | $-0.75783 \times 10^{-16}$ |
| 4 (SS) | 0 | $-0.84313 \times 10^{-5}$ | $0.34172 \times 10^{-8}$ | $-0.22916 \times 10^{-11}$ |

What is claimed is:

1. A dual field-of-view objective optical system capable of operating in the 3–5 micron thermal infra-red waveband, comprising a fixed front lens (A) and a fixed rear lens (H) aligned on a common optical axis (41) and an intermediate lens (D) located between the front and rear lenses (A,H) and movable axially along the optical axis (41) between two alternative in-use positions which provide two alternative focal lengths for the system, said front lens (A) being a positively-powered single element made from silicon, said intermediate lens (D) being negatively powered and comprising a first lens element (B) of greater negative power than is required solely for the field of view change and being made of a material which is relatively dispersive in the 3–5 micron waveband and relatively sensitive to thermal change of refractive index, and a second lens element (C) of positive power sufficient to correct the power of the intermediate lens (D) and made of a material which is relatively nor-dispersive in the 3–5 micron waveband and relatively insensitive to thermal change of refractive index, said rear lens (H) being positively powered and comprising a first lens element (E) which is positively powered and made of a material which is relatively non-dispersive in the 3–5 micron waveband and relatively insensitive to thermal change of refractive index, and a second lens element (G) which is negatively powered and made of a material which is relatively dispersive in the 3–5 micron waveband and relatively sensitive to thermal change of refractive index, wherein each lens element (A through G) in the system is made of a material having a positive temperature/ refractive index change coefficient and the relative power of the lens elements of the intermediate lens (D) and of the rear lens (H) are arranged to provide correction for chromatic aberration and thermal defocus of the system in both focal settings of the system.

2. An optical system as claimed in claim 1, wherein said single element fixed front lens (A) incorporates an aspheric refractive surface (1,2) to provide correction for monochromatic aberration.

3. An optical system as claimed in claim 1 wherein said rear lens (H) is formed by three lens elements (E, F, G) and the third lens element (F) is positively powered and made of a material which is relatively non-dispersive in the 3–5 micron waveband and relatively insensitive to thermal change of refractive index.

4. An optical system as claimed in claim 1, wherein the negatively-powered lens elements (B,G) of the intermediate and rear lenses (D,H) are made of Germanium.

5. An optical system as claimed in claim 1, wherein the positively-powered lens elements (C, E, F) of the intermediate and rear lenses (D, H) are made of Zinc Sulphide and/or Zinc Selenide and/or Arsenic Trisulphide.

6. An optical system as claimed in claim 2 wherein the aspheric surface (1,2) of the front lens (A) also has a surface-relief hologram to form a hybrid surface which fully achromatises the system on and off axis.

\* \* \* \* \*